Feb. 18, 1958 W. M. FURLOW, JR 2,824,222

DIGIT STORAGE CIRCUIT

Filed Feb. 26, 1954

INVENTOR
WILLIAM M. FURLOW JR.

BY [signature]

[signature]

ATTORNEYS 2,824,222

DIGIT STORAGE CIRCUIT

William M. Furlow, Jr., Arlington, Va., assignor to the United States of America as represented by the Secretary of the Navy Application February 26, 1954, Serial No. 412,965
3 Claims. (Cl. 250—27)
(Granted under Title 35, U. S. Code (1952), sec. 266)

This invention relates generally to unstable trigger circuits and more particularly to binary digit storage circuits.

In the computer and analogous arts, it is often necessary to store a binary indication for a finite period of time while other information is read into the device or other manipulations performed. There are numerous circuits adapted to perform these functions under different conditions and circumstances. Most of the circuits are variations of the multivibrator and more specifically the Eccles-Jordan trigger circuit.

The invention described herein is an adaptation of a cathode coupled multivibrator whereby several important functional advantages have resulted. The circuit has two different states of conduction which serve to indicate a single binary value. As in the Eccles-Jordan circuit, conduction by either one of two tubes will indicate the state or value stored by the circuit. Because of the limited storage time desired, the device is designed to reset itself after a certain length of time. The device is also designed so that the pulse which reads out the condition of the circuit automatically resets the device to its stable state. It was also desired to provide a circuit which would recover quickly so that it would be responsive within a short interval to succeeding pulses.

One object of this invention, therefore, is to provide an improved binary digit storage circuit.

Another object of this invention is to provide an improved storage circuit in which the read out signal resets the circuit to an initial condition.

Another object of this invention is to provide an improved cathode coupled multivibrator which remains in an unstable state a relatively long time but which is responsive to additional pulses in relatively short periods.

Another object of this invention is to provide an improved binary storage circuit the output of which may be fed to a low impedance load.

Another object of the invention is to provide a novel binary storage circuit having separate read in and read out circuits.

Other objects and many of the attendant advantages of this invention will be readily appreciated as the same becomes better understood by reference to the following detailed description when considered in connection with the accompanying drawings wherein.

Figure 1:
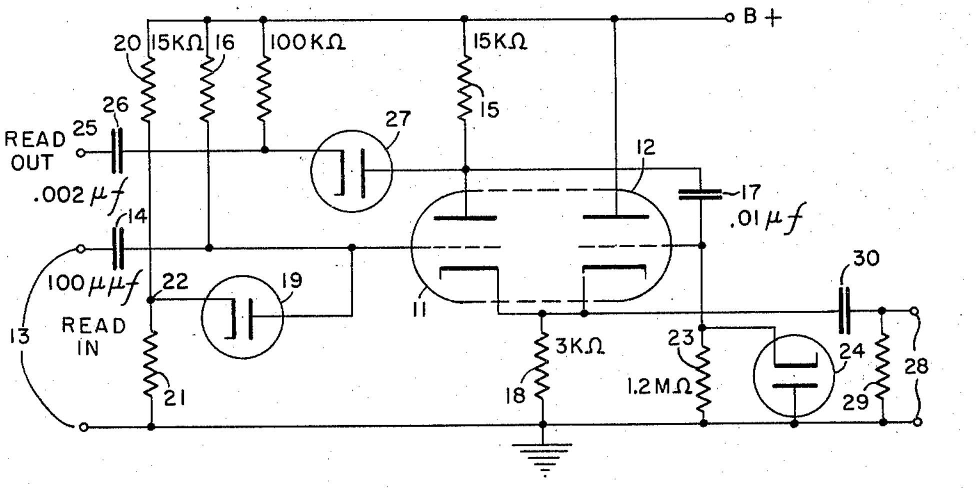
Figure 1 represents a schematic drawing of a preferred embodiment of the invention.

As shown in Figure 1, the circuit contains two tubes, the left one of which is normally conducting. When the left tube is conducting, the circuit is in the state which will be termed state 0. A negative pulse applied to the grid of the left tube will cause it to cutoff and the right tube to conduct; this state of conduction of the circuit will be termed state 1. The application of a read out signal, a negative pulse, to the plate of the left tube and the grid of the right tube causes the circuit to remain at or return to state 0 depending on the state of the circuit when it receives the read out signal. An output pulse is produced at the time of read out if the right tube had been conducting and was cutoff, i. e., if the circuit was in state 1 at read out, an output pulse will be obtained.

In the circuit shown in Fig. 1, the triodes 11 and 12 may be halves of a dual tube such as a 6BN7 or its equivalent. The negative pulse representing a binary indication is applied across input or read in terminals 13. The pulse is transmitted through coupling condenser 14 to the grid of tube 11. Until the application of this negative pulse, tube 11 is conducting by virtue of the voltage applied through resistance 15 to the plate of tube 11 and through resistance 16 to the grid of tube 11. The negative pulse applied to the grid of tube 11 drives the grid below cutoff. As a result of this cutoff the voltage rises on the plate of tube 11, and the grid of tube 12, which is connected to the plate of tube 11 through condenser 17, becomes positive as condenser 17 is charged.

As the grid of tube 12 becomes more positive, it begins to conduct. The connection between B+ and the plate of tube 12 includes no voltage dropping element, therefore the current flow through tube 12 and the common cathode resistor 18 biases the cathode more positively than it did when tube 11 was conducting. Thus, after the negative read in pulse has been applied, the circuit is changed to a semi-stable state in which tube 12 is conducting, i. e., state 1. It will be explained below why state 1 is not a completely stable state.

After tube 11 has been cutoff by the negative read in pulse, condenser 14 begins to recharge through resistance 16 and immediately starts to raise the grid voltage of tube 11. In the absence of other circuit connections, the grid would be charged to a voltage above cutoff in a time determined by the time constant of resistance 16 and condenser 14. Inasmuch as it is desired to store the binary information for some finite period which may be very short relative to the unstable period of the circuit, means are provided to prevent tube 11 from immediately returning to the conducting state except in the presence of a read out signal and yet be quickly susceptible to flip in the presence of a read out signal.

This function is performed by diode 19 which is connected between the grid of tube 11 and a source of voltage. The voltage source is slightly below the cutoff value for the tube 11 as established by the cathode bias created by conduction in the other tube, tube 12. This voltage source may be obtained through the use of a voltage divided placed between the plate supply voltage and ground. The divider is made up of resistances 20 and 21 with the cathode side of diode 19 connected to the junction point 22 of the resistances. Thus, the grid of tube 11 is prevented from rising above the voltage of junction point 22 of the voltage divider. Therefore, tube 11 will remain cut off until the positive bias on the cathode is reduced. This reduction in turn, will occur only when the conduction of tube 12 is limited. It should be understood that the diodes used in the circuit may be either crystal or vacuum diodes.

For the circuit parameters shown in Figure 1, tube 12 will not remain in state 1, i. e., the conducting condition, more than several hundred microseconds. The charge on condenser 17, created by the non-conducting conditions of tube 11, is dissipated through grid current and leakage across resistance 23. As a result of this decrease in grid potential in tube 12, conduction will cease in tube 12 after several hundred microseconds effecting an automatic reset or return to state 0. This reset is accomplished when the current drawn by tube 12 decreases to such an extent that the bias developed across cathode resistance 18 has decreased to a value whereby conduction in tube 11 commences again. As current flow in tube 11 increases, the plate voltage falls. This negatively going voltage coupled to the grid of tube 12 by condenser 17 tends to create a more negative charge on the grid of tube 12. The potential of the grid after receiving this negative charge would tend to be less than ground potential. Diode 24 is, therefore, connected between the grid of tube 12 and ground to prevent the grid from becoming biased below ground; the diode is commonly known as a D. C. restorer. This restoring action is necessary since the amount of bias below ground would tend to increase with each cycle until tube 12 could no longer be pulsed into conduction.

It has been shown that the circuit will automatically reset after a period of time. Normally the information contained in the circuit, as represented by its state of conduction, will be read out by another negative pulse. The read out pulse is applied to terminal 25 whereby it is transmitted through coupling condenser 26, diode 27 and condenser 17 to the grid of tube 12. If tube 12 is cutoff at the time the read out pulse is applied, it has no effect on the conduction state of the circuit. The pulse has little effect on the plate voltage of tube 11, and the driving more negative of the grid of tube 12 will have no effect if it is cutoff. Therefore when a read out pulse is applied to the circuit in state 0 (tube 12 not conducting), no signal is received at output terminals 28 which are connected across load resistor 29 to the cathode of tube 12 through coupling condenser 30.

However, if the circuit is in state 1 when the pulse is applied, there will be an output produced as well as a resetting of the circuit to state 0. If tube 12 is conducting when the negative pulse charges condenser 17, the pulse will tend to reduce the grid voltage. The grid voltage drop will be accompanied by a reduction in current flow through tube 12, which will reduce the cathode bias across resistance 18. When the cathode bias drops slightly, tube 11, the grid of which was just slightly below cutoff, will begin to conduct. This conduction decreases the voltage at the plate of tube 11; the negative going voltage on the plate of tube 11, as was explained above, creates a more negative grid voltage in tube 12. This action continues until tube 12 is completely cutoff and tube 11 is conducting.

The change in condition of tube 12 from conducting to non-conducting will effect a change in cathode bias. Tube 11 is limited in current conduction to a value less than tube 12 by resistance 15. Thus the cathode bias will decrease in changing from state 1 to state 0. This change in voltage will be transmitted through coupling condenser 30 to output terminals 28. Thus, when tube 12 is conducting at the time a read out pulse is received, a signal will be produced at the output terminals 28. If the circuit is in state 0 when the read out pulse is received, there will be no change in circuit state and no output pulse produced at terminals 28.

To effect the advantages possible with the circuit of Figure 1, appropriate circuit values must be chosen with certain factors in mind. For example, to make possible the high repetition rate desired or rapid recovery time of the circuit, the time constant of grid charging circuit of tube 11 should be made very short. This part of the circuit includes resistance 16, between the plate supply and grid, and condenser 14 which couples the grid of tube 11 to the trigger source of binary information. The purpose of the short time constant is to permit the grid, on cutoff of tube 11 by a negative pulse, to return quickly to a point slightly below cutoff. This short time constant would result in rapid return of the circuit to state 0 but for the clamping action of the voltage divider and diode 19 which prevent the grid from rising above cutoff. By returning the grid cathode voltage of tube 11 rapidly to a value below cutoff, the tube 11 will be rapidly placed in a condition to respond to a slight change in the cathode bias as effected by a read out pulse initiating conduction in tube 12. Because of the sensitive state of tube 11, a very small negative pulse is sufficient to start conduction in tube 11, which, because of its decreasing plate voltage, will complete the cutoff of tube 12. If instead of using diode 19 and the voltage dividing resistances 20 and 21, the time constant of resistance 16 and condenser 14 were made long enough to keep the grid of tube 11 below cutoff during the unstable state of the circuit, it will be seen that tube 11 would have been relatively insensitive to change except at the very end of the unstable period of the circuit. Because of the exponential approach to cutoff by the grid of tube 11 as produced by the time constant of resistance 16 and condenser 14, the grid would be biased far below cutoff during the early part of the unstable period thus requiring a much larger pulse to cause it to conduct. By use of the divider and diode, the time constant may be very short without shortening the unstable period, thus permitting the tube 11 to be biased to a sensitive condition during the entire unstable period.

It should also be noted that the reset function may be accomplished in two ways. The read out pulse may automatically reset the circuit to state 0, or in the absence of any pulse, the circuit will automatically return to state 0. The speed of the latter reset can be regulated by the values of condenser 17 and grid leak resistor 23 which are connected to the grid of tube 12.

Figure 2:
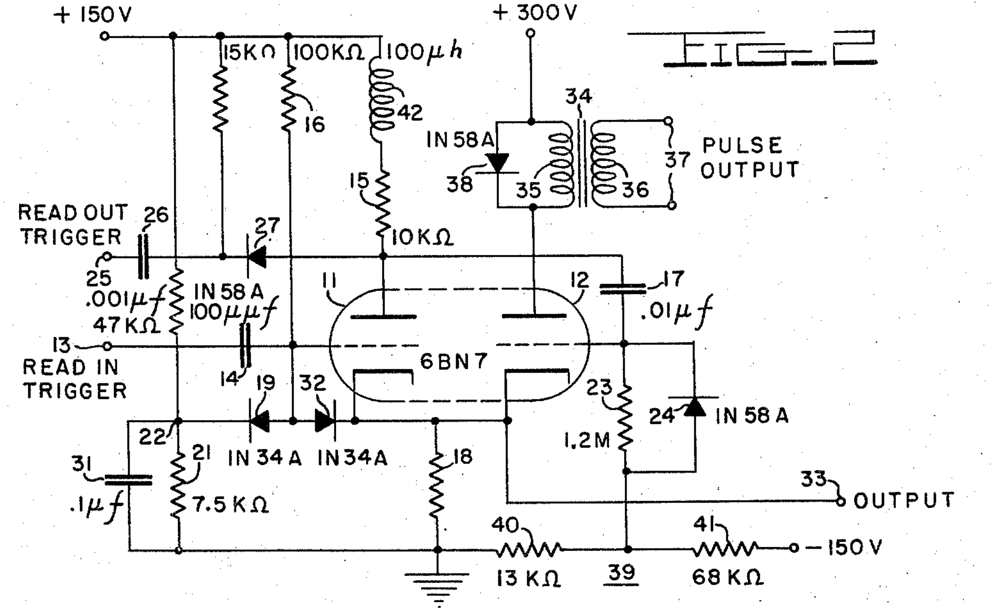
Figure 2 represents a schematic drawing of another embodiment of the invention.

The circuit of Figure 2 represents a more refined version of the embodiment of Figure 1 which operates in substantially the same manner. A different means is shown for obtaining an output pulse when a change in state has been effected. In addition, the bias voltages on the circuit have been changed as shown.

The triodes 11 and 12 perform a similar function in Figure 2 as in Figure 1 indicating the states of the circuit by conduction in one of the two tubes. The other corresponding circuit elements are given similar reference numerals in Figure 2. Condenser 31 has been added in parallel with resistance 21 of the voltage divider to prevent change in the potential of junction point 22 of the divider when current is passed through diode 19. The plate voltage on tube 11 is 150 volts as in Figure 1 but the voltage on tube 12 has been increased to 300 volts to increase the difference in current flow between the two states of conduction.

Diode 32 has been inserted between the grid and cathode of tube 11 to prevent the grid voltage of tube 11 from exceeding the voltage developed across the cathode resistor 18 during the period of conduction in tube 11. By thus limiting the grid voltage in state 0, the circuit is sensitive to smaller input trigger pulses. The circuit is also provided with two means of taking an output in response to a change in conduction of tube 12. Output terminal 33 is connected to the common cathode connection. As was pointed out previously, there will be different voltages across cathode bias resistor 18 depending on which of the two tubes is conducting. Because of the lower impedance in the circuit of tube 12, it will draw more current and hence produce a larger drop across resistance 18. The use of the higher plate voltage on tube 12 further increases the ratio between the voltage in state 1 and state 0. It can be seen therefore that the magnitude of the voltage at terminal 33 would indicate the storage state of the circuit. It should be noted that both circuits are well adapted to produce low impedance outputs without the use of an extra cathode follower circuit. This feature, of course, results in tube economy in many applications of this type of circuit.

If a pulse output is desired, an alternative to the means shown in Figure 1 is the transformer coupling to the plate circuit of tube 12 as shown in Figure 2. Transformer 34 is connected with its primary 35 between the plate supply voltage and the plate. Output terminals 37 are connected to the ends of secondary winding 36.

When tube 12 is conducting, state 1, a read out pulse, which will cutoff tube 12 as explained above, will cause a pulse to be produced at terminals 37. This pulse results from the cessation of current flowing through tube 12 and primary winding 35. Diode 38 is connected in parallel with coil 35 to damp out any oscillations developed in coil 35. It should be noted that the polarity of the diode is such that only the initial oscillation created on terminating the flow of current in tube 12 will appear at the output, the succeeding oscillation being shorted out by the diode 38. When current begins flowing in tube 12, no output will be received since the initial oscillation is shorted out by the diode 38.

It should be understood that the characteristics of transformer 35 are chosen to give the desired sharpness or peaking of the output pulse.

Voltage divider 39 made up of resistances 40 and 41 is provided to negatively bias the grid of tube 12 well below cutoff during periods of conduction in tube 11. This negative bias becomes necessary to assure cutoff of tube 12 when operating with a plate voltage substantially larger than tube 11. Thus, the divider 39 is connected between ground and the 150 volt negative source. The grid of tube 12 is then connected through grid leak resistance 23 to the junction point of resistors 40 and 41. Diode 24 serves as a D. C. restorer as in Figure 1 to prevent the grid from being biased below the potential of junction point of the divider.

Coil 42 has been added to the plate circuit of tube 11 to provide an RL peaking circuit which will speed the action of the circuit when tube 11 is cutoff.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A digit storage circuit comprising first and second electron tubes, the first of which is normally conducting; each of said tubes having at least a cathode, a control grid and a plate electrode; said tubes having a common cathode load impedance; output terminals connected across said cathode load impedance; a first time constant circuit connected to said first tube grid; said first time constant circuit including a first condenser for applying a negative read-in pulse representative of a binary indication to the grid of said first tube; a second time constant circuit; said second time constant circuit including a second condenser connected between said first tube plate and said second tube grid and a grid leak resistor connected to said second tube grid; a voltage source; means connecting said first and second tubes to said source of voltage such that the maximum tube current in said first tube is less than the maximum tube current in said second tube; the means connecting said first tube and said voltage source including a serially connected resistance-inductance peaking circuit; biasing means having a voltage output of a magnitude in the vicinity of and less than the cut-off grid voltage of said first tube when said second tube conducts, unidirectional means interconnecting said biasing means and said first tube grid such that the voltage on said first tube grid is limited to the magnitude of said biasing means output; said first time constant circuit being adapted to control the time duration requisite to return said first tube grid to the magnitude of said biasing means output following a negative read-in pulse to said first tube grid; the time constant of said second time constant circuit being greater than the time constant of said first time constant circuit; and read-out pulse means connected to said second tube grid and operative to stop conduction in said second tube, and to produce an output voltage indication, when said second tube is conducting.

2. A digit storage circuit comprising first and second electron tubes, the first of which is normally conducting; each of said tubes having at least a cathode, a control grid and a plate electrode; said tubes having a common cathode load impedance; output terminals connected across said cathode load impedance; a first time constant circuit connected to said first tube grid; said first time constant circuit including a first condenser for applying a negative read-in pulse representative of a binary indication to the grid of said first tube; a second time constant circuit; said second time constant circuit including a second condenser connected between said first tube plate and said second tube grid and a grid leak resistor connected to said second tube grid; a voltage source; means connecting said first and second tubes to said source of voltage such that the maximum tube current in said first tube is less than the maximum tube current in said second tube; biasing means having a voltage output of a magnitude in the vicinity of and less than the cut-off grid voltage of said first tube when said second tube conducts, unidirectional means interconnecting said biasing means and said first tube grid such that the voltage on said first tube grid is limited to the magnitude of said biasing means output; said first time constant circuit being adapted to control the time duration requisite to return said first tube grid to the magnitude of said biasing means output following a negative read-in pulse to said first tube grid; the time constant of said second time constant circuit being greater than the time constant of said first time constant circuit; and read-out pulse means connected via said second condenser to said second tube grid and operative to stop conduction in said second tube, and to produce an output voltage indication, when said second tube is conducting.

3. A digit storage circuit comprising first and second electron tubes, the first of which is normally conducting; each of said tubes having at least a cathode, a control grid and a plate electrode; said tubes having a common cathode load impedance; output terminals connected across said cathode load impedance; a first time constant circuit connected to said first tube grid; said first time constant circuit including a first condenser for applying a negative read-in pulse representative of a binary indication to the grid of said first tube; a second time constant circuit; said second time constant circuit including a second condenser connected between said first tube plate and said second tube grid and a grid leak resistor connected to said second tube grid; a voltage source; means connecting said first and second tubes to said source of voltage such that the maximum tube current in said first tube is less than the maximum tube current in said second tube; biasing means having a voltage output of a magnitude in the vicinity of and less than the cut-off grid voltage of said first tube when said second tube conducts, unidirectional means interconnecting said biasing means and said first tube grid such that the voltage on said first tube grid is limited to the magnitude of said biasing means output; said first time constant circuit being adapted to control the time duration requisite to return said first tube grid to the magnitude of said biasing means output following a negative read-in pulse to said first tube grid; the time constant of said second time constant circuit being greater than the time constant of said first time constant circuit; and read-out pulse means connected to said second tube grid and operative to stop conduction in said second tube, and to produce an output voltage indication, when said second tube is conducting.

References Cited in the file of this patent

UNITED STATES PATENTS

| | | |
|---|---|---|
| 2,405,843 | Moe | Aug. 13, 1946 |
| 2,478,683 | Bliss | Aug. 9, 1949 |
| 2,502,687 | Wiener | Apr. 4, 1950 |
| 2,536,808 | Higinbotham | Jan. 2, 1951 |
| 2,562,660 | Chance | July 31, 1951 |
| 2,644,887 | Wolfe | July 7, 1953 |
| 2,683,806 | Moody | July 13, 1954 |
| 2,684,442 | Gray et al. | July 20, 1954 |
| 2,696,557 | Gray | Dec. 7, 1954 |
| 2,747,094 | Walker | May 22, 1956 |